United States Patent [19]

Sewill et al.

[11] Patent Number: 5,685,335

[45] Date of Patent: Nov. 11, 1997

[54] LAMP PROCESSING MACHINE

[76] Inventors: Dennis Sewill, 16080 N. Enchanted Dr. Northwest, Andover, Minn. 55304; Timothy J. Sullivan, 133 104th Ave. Northwest, Coon Rapids, Minn. 55448; Richard Potts, 22296 7th St. Northeast, East Bethel, Minn. 55011; Bret Robole, 6083 373rd St., North Branch, Minn. 55056; Gregory J. Patten, 821 Moonlight Pl., Woodbury, Minn. 55125; Wade Beauchaine, 7413 122 Ave. North, Champlin, Minn. 55316

[21] Appl. No.: 550,176

[22] Filed: Oct. 30, 1995

Related U.S. Application Data

[62] Division of Ser. No. 246,869, May 20, 1994.

[51] Int. Cl.[6] .............................. F16K 15/03; B60C 19/12
[52] U.S. Cl. ............................. 137/527.6; 137/527.8; 251/12; 241/99
[58] Field of Search ........................ 137/527.6, 527.8, 137/907; 251/12; 241/36, 99

[56] References Cited

U.S. PATENT DOCUMENTS

| | | | |
|---|---|---|---|
| 2,593,657 | 4/1952 | Coon et al. | 241/47 |
| 2,620,988 | 12/1952 | Tellier | 241/62 |
| 2,628,036 | 2/1953 | Hall | 241/47 |
| 2,866,604 | 12/1958 | Hall | 241/99 |
| 3,144,876 | 8/1964 | Frye | 137/527.6 X |
| 3,233,836 | 2/1966 | Merges | 241/73 |
| 3,614,003 | 10/1971 | Tremolada | 241/79.3 |
| 3,623,672 | 11/1971 | De Frank | 241/36 |
| 3,658,263 | 4/1972 | Zeisler et al. | 241/56 |
| 3,865,319 | 2/1975 | Hofmann | 241/188 |
| 3,913,849 | 10/1975 | Atansoff et al. | 241/55 |
| 4,069,979 | 1/1978 | Morita et al. | 241/5 |
| 4,480,797 | 11/1984 | Weiss | 241/65 |
| 4,494,564 | 1/1985 | Lukacz | 137/527.6 |
| 4,545,540 | 10/1985 | Nakamura | 241/99 |
| 4,579,287 | 4/1986 | Brown | 241/36 |
| 4,607,798 | 8/1986 | Odlin | 241/99 |
| 4,635,860 | 1/1987 | Kruyer | 241/23 |
| 4,655,404 | 4/1987 | Deklerow | 241/99 |
| 4,858,833 | 8/1989 | Hanulik | 241/24 |
| 5,042,724 | 8/1991 | Perry | 241/19 |
| 5,062,601 | 11/1991 | Graf | 241/79.3 |
| 5,092,527 | 3/1992 | Perry et al. | 241/19 |
| 5,106,598 | 4/1992 | Cogar | 423/99 |
| 5,205,497 | 4/1993 | Deklerow | 241/36 |
| 5,454,519 | 10/1995 | Luck | 241/24 |

OTHER PUBLICATIONS

Brochure entitled "USA Lights–Now a Safe Proven Method for Recycling Fluorescent Lamps", U.S. Environmental, Inc., published on or before Oct. 6, 1995.

*Primary Examiner*—John Rivell
*Attorney, Agent, or Firm*—Nawrocki, Rooney & Sivertson

[57] ABSTRACT

A lamp processing machine for separating glass, powder and metal lamp components placed within the machine. The machine may include two generally cylindrical, concentrically mounted screens and a tube concentrically mounted between the screens. The screens may be mounted within an enclosure having separate outlets for the powder, glass and metal.

4 Claims, 7 Drawing Sheets

LAMP PROCESSING MACHINE

This is a divisional of application Ser. No. 08/246,869 filed on May 20, 1994 currently pending.

BACKGROUND OF THE INVENTION

The present invention pertains generally to the field of lamp disposal machines.

Each year, billions of lamps (light bulbs) are consumed and are disposed of. These lamps present a significant source of recyclable material. Each lamp includes glass and metal components. Some lamps, for example fluorescent lamps, include hazardous material such as mercury. In the case of mercury, not only does recycling provide a renewable source of material, but eliminates a hazardous waste disposal problem.

Numerous devices have been developed to aid in the disposal of lamps. For example, U.S. Pat. No. 2,593,657 to Coon et al., discloses a lamp crusher. The lamp crusher includes a housing into which lamps are feed and crushed against an anvil by a hammer. A bin is placed beneath the housing to collect the resulting lamp components. In the case of fluorescent lamps, these components include powder, glass and metal end caps. An exhaust fan draws air and airborne particles, which may include a portion of the powder, from the housing through an exhaust conduit. The fan exhausts the air and airborne particles directly to the atmosphere.

Another device is disclosed by U.S. Pat. No. 5,042,724 to Perry. The device disclosed by Perry includes a fracture chamber into which lamps are feed. Positioned below the fracture chamber is a bin toward which the lamp components fall. A cyclone is connected to the fracture chamber to draw air and suspended particles including powder out of the fracture chamber. Within the cyclone, heavier particulate settles into a container. The remaining air is then discharged to the atmosphere through a series of filters to recover additional particulates.

Yet another device is disclosed by U.S. Pat. No. 5,205,497 to Deklerow. The device disclosed by Deklerow includes a circular cover plate mountable on a waste bin. The cover plate includes a lamp feeder tube which guides lamps into a rotating bar which fractures the lamps into powder, glass and metal components. These components then fall into the bin. A fan draws suspended powder particles from the bin through a filter, discharging filtered air to the atmosphere.

None of these devices disclose a device which separates the three primary lamp components within an enclosure. The device disclosed by Coon et al. deposits all of the lamp components, except certain suspended particles, into a common bin. Likewise, Perry discloses a device which deposits glass and metal lamp fragments into a common bin. Deklerow discloses depositing metal and glass fragments in a-common bin and drawing certain particulate laden air through a filter.

SUMMARY OF THE INVENTION

The present invention is directed at a device capable of separating fluorescent lamps into powder, glass and metal components. The present invention may also be used to separate other types of lamps. Other lamps may or may not include a powder. The powder may contain a hazardous material such as mercury. The glass and metal components may be recycled. The powder may refined to recover the mercury for reuse. The remaining powder may be landfilled.

The present invention provides a device which can separate lamps into powder, glass and metal components. The device may deposit these components into separate bins for transport to a recycler. The machine in accordance with the present invention preferably includes an enclosure to contain powder, including mercury, released when the lamps are broken.

An embodiment of the present invention provides a lamp processing machine for separating glass, powder and metal lamp components includes first and second generally cylindrical screens. Each screen has a longitudinal axis a side and first and second ends. The screens are mounted for rotation about their respective longitudinal axes. A device is provided for breaking the lamps. A motor rotates the first screen about its longitudinal axis such that broken lamp components tumble within the first screen until the glass and powder pass through the side of the first screen to the second screen. The metal components exit one end of the first screen. The motor also rotates the second screen about its longitudinal axis such that the powder and glass, from the first screen, tumble within the second screen until the powder passes through the side of the second screen and the glass exits one end.

The first screen may be concentrically mounted within the second screen. The machine may also include a generally cylindrical tube mounted concentrically around the first screen, between the first and second screens. A helical band encircles the first screen between the first screen and the tube. The first screen, the tube and the second screen may be sloped longitudinally such that as the screens rotate, metal lamp components can roll downward toward the lower end of the first screen. The powder and glass pass through the side of the first screen to the tube and are carried upward by the helical band toward the upper end of the second screen. Proximate the upper end of the second screen, the powder and glass fall through the tube. The powder passes through the second screen and the glass rolls downward toward the low end of the second screen. The powder and glass each fall into separate bins or containers. Specifically, the metal components fall from the low end of the first screen into a bin, the glass components fall from the low end of the second screen into a bin and the powder falls through the side of the second screen into a bin.

An embodiment of the lamp processing machine includes an enclosure. A device for separating the powder, glass and metal lamp components can be placed within the enclosure. The interior of the enclosure may be maintained at a slight negative pressure, that is at a pressure less than the air pressure outside the enclosure (usually atmospheric). Maintaining negative pressure within the enclosure draws clean air into the enclosure through any leaks, rather than allowing contaminated mercury-laden air to escape through any leaks.

The lamp processing machine may also include a lamp injection tube for introducing lamps into the enclosure through a lamp inlet. One end of the lamp injection tube may include a valve for sealing the end of the tube when a lamp is not being introduced into the enclosure through the tube. The enclosure can include outlets for the powder, glass and metal components. A blower may recirculate air from the enclosure into the glass and metal outlets and the lamp inlet to force powder and mercury-laden air back into the enclosure.

The lamp processing machine may also include a cooling device to cool the enclosure. Cooling the enclosure aids the condensation of mercury vapor within the enclosure. The cooling device may also dry fresh air introduced into the enclosure to reduce the moisture content within the enclosure. Excess moisture in the enclosure may cause the powder to form a paste which would be difficult to remove from the enclosure.

An embodiment of the lamp processing machine may include a pneumatic reflex valve for the injection tube. The valve includes a hinge mounted near one end of the tube. A flapper is mounted to the hinge for rotation between a first closed position generally covering or sealing the end of the tube and a second position opening the end of the tube. The flapper preferably seals the end of the tube at an oblique angle.

In an embodiment, the pneumatic reflex valve includes a source of low air pressure and a source of relatively higher air pressure. The valve includes a flapper having first and second ends extending generally in opposite directions from the hinge. Each end has first and second sides. The first sides are exposed to the low pressure source and the second sides are exposed to the high pressure source. The pressure sources are controlled to exert forces on the sides to move the flapper between the first closed position and the second open position. For example, the pressure on one side of one end may be increased to move the flapper to the second open position in response to insertion of a lamp in the tube.

Another embodiment of the pneumatic reflex valve may include an air ram responsive to a lamp passing a sensor in the tube. The ram can pull the flapper toward the second position from the first position and push the flapper from the second position back toward the first position.

DETAILED DESCRIPTION OF THE INVENTION

Figure 1:
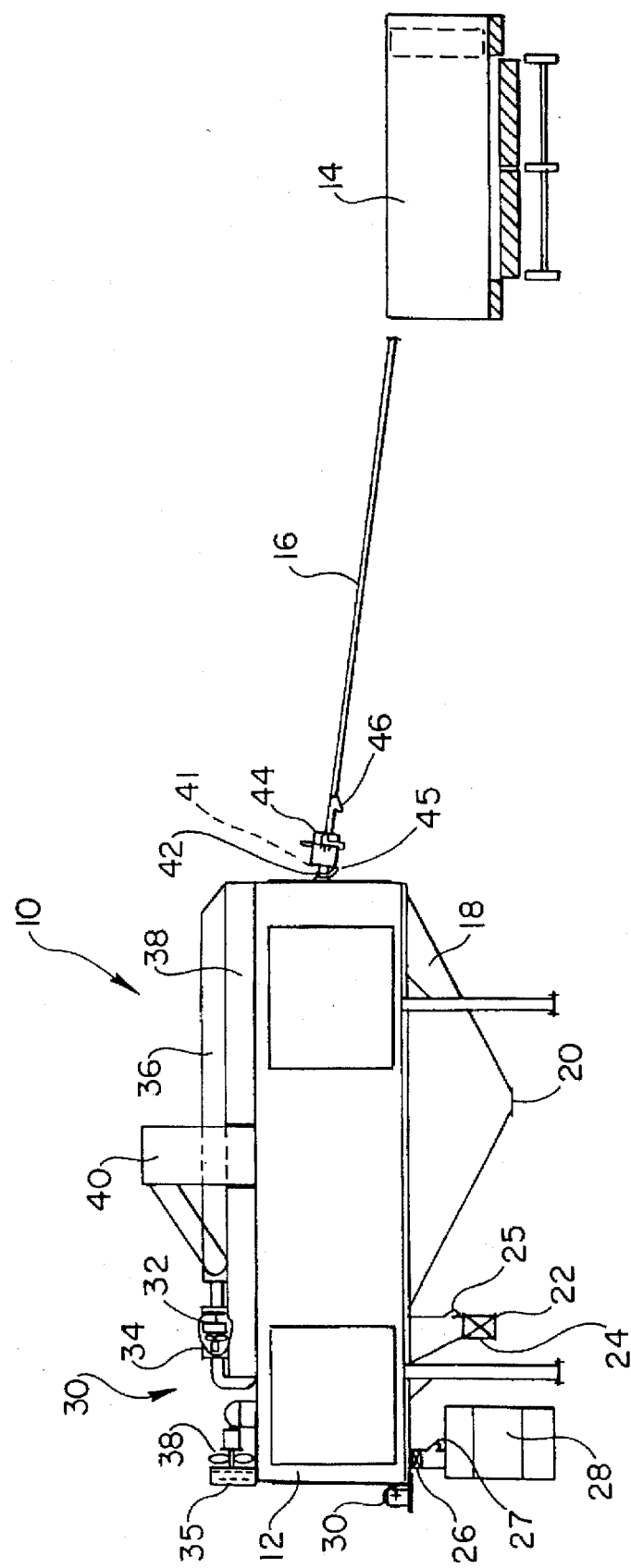
FIG. 1 shows an exterior side view of a lamp processing machine in accordance with the present invention.

Referring now to the drawing wherein like reference numerals indicate like elements throughout the several views, FIG. 1 shows a lamp processing machine 10 in accordance with the present invention. Lamp processing machine 10 includes a housing or enclosure 12. Light bulbs or lamps such as fluorescent lamps may be brought to machine 10 in crates 14. The lamps are drawn into enclosure 12 by injection tube 16. A suction is placed on the tube proximate the enclosure through a suction port 46 to draw lamps through injection tube 16. Within enclosure 12 the lamps are broken and separated into powder, glass and metal lamp components by a rotating trummel. A motor 30 is provided to rotate the trummel. The powder settles in pan 18 and exits enclosure 12 through outlet 20, glass exits through outlet 22 which may include a rotary air lock 24. The metal components, such as end caps, exit enclosure 12 through metal outlet 26. FIG. 1 also shows a barrel 28 for collecting end caps discharged from opening 26.

A cooling system 30 may be provided to cool the interior of enclosure 12. Cooling the interior of enclosure 12 aids in the condensation of mercury vapor which is released within the enclosure when the fluorescent lamps are broken. The cooling system may include refrigeration coils 32 and a fan 34 to circulate cool air through an air-to-air heat exchanger 36 and a cold air plenum 38. Coils 35 are connected to coils 32. A fan 38 is provided to blow air over coils 35. Coils 35 and fan 38 dissipate heat as well known in the art of refrigeration and cooling.

As mentioned above, cooling system 30 cools the interior of enclosure 12. One way that this accomplished is by recirculating air through air-to-air heat exchanger 36, cold air plenum 38 and over refrigeration coils 32. As cold air circulates over coils 32 and through heat exchanger 36 and plenum 38, the air does not come in contact with contaminated air from the enclosure. The proximity of cold airplenum 38 to enclosure 12 allows heat to be absorbed from the enclosure by the cool air within plenum 38.

Lamp processing machine 10 may also include a recirculation blower 40. Recirculation blower 40 draws air out of enclosure 12 and reintroduces that air into enclosure 12 through air inlet 25, 27 and 45 as will be explained below in detail by reference to FIG. 5. Blower 40 includes a filter to remove dust from the air drawn from enclosure 12. After the air drawn by blower 40 passes through the filter, the air is introduced into air-to-air heat exchanger 36. It should be noted, however, that the air introduced by blower 40 into air-to-air heat exchanger does not mingle with the air circulated by cooling system 30 through air-to-air heat exchanger 36 and cold air plenum 38. Rather, the air drawn from enclosure 12 by blower 40 is circulated through piping within heat exchanger 36. The piping may be a thin plate coil labyrinth or other suitable piping as well known in the art of refrigeration and cooling.

Injection tube 16 is preferably mounted to enclosure 12 at a lamp inlet 41 by a ball and socket joint 42. This allows the receiving end of injection tube 16 to be placed close to lamps positioned in various locations within crate 14. Injection tube 16 may also include a pneumatic reflex valve 44 which remains closed except while a lamp is introduced into the enclosure. It can be appreciated that lamps may be introduced directly into an opening in enclosure 12 without the aid of injection tube 16. In addition to injection tube 16 other mechanical means may be used to introduce the lamps into enclosure 12, such as conveyer belts, rollers or gravity feed. If injection tube 16 is not used, it may be desirable to use a flexible seal around lamp inlet 41 which seals around the lamps as they are introduced into enclosure 12.

Figure 2:
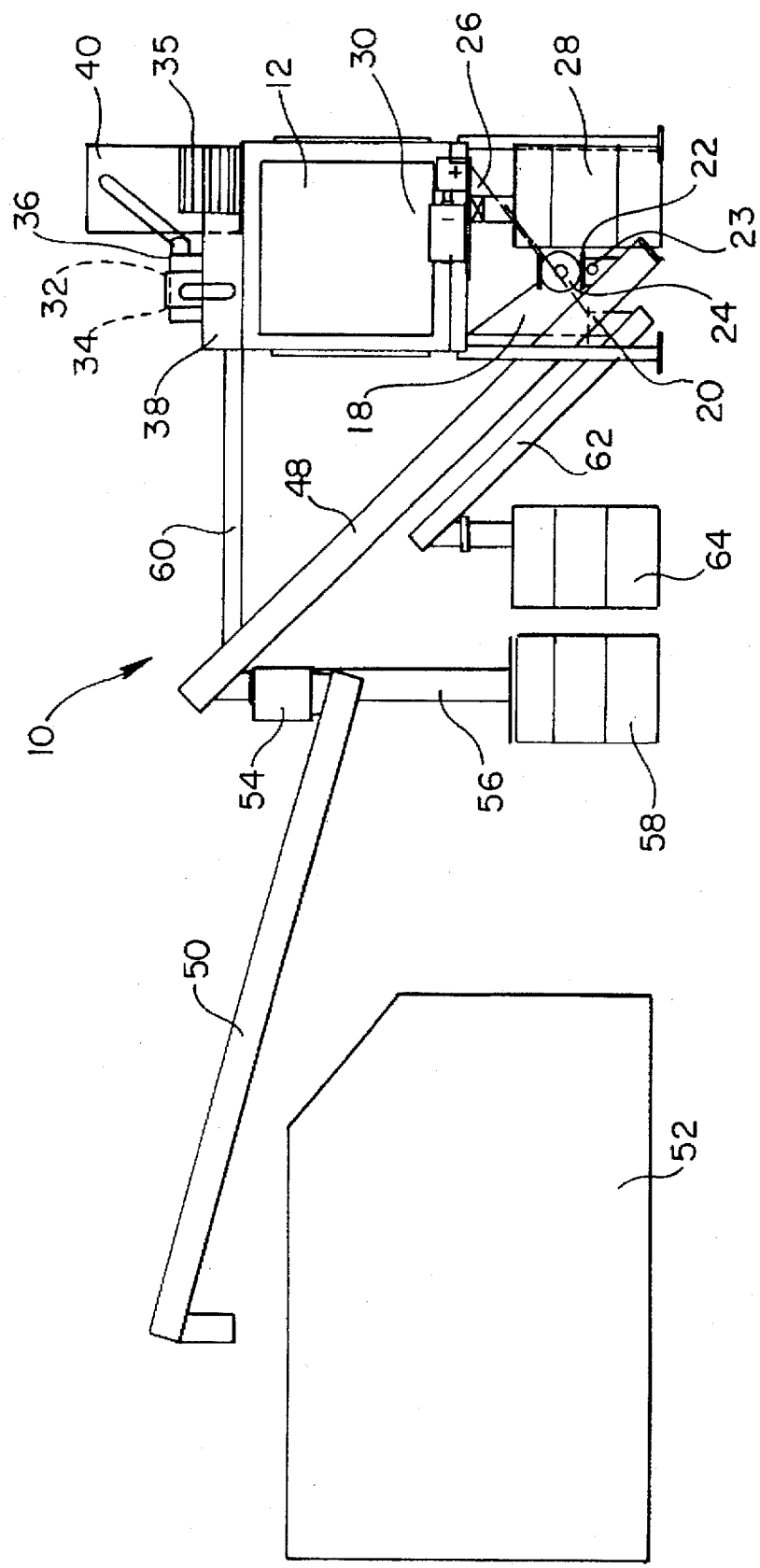
FIG. 2 shows an exterior end view of the lamp processing machine in accordance with the present invention.

FIG. 2 shows an end view of lamp processing machine 10. As shown in FIG. 2 a series of auger screws 48 and 50 may be used to lift glass from outlet 22 to a hopper 52. It can be appreciated that the powder, glass and metal lamp components discharged from enclosure 12 need not be conveyed by auger screws. The lamp components may fall directly into bins or hoppers or be conveyed by any other means known to those skilled in the art of materials handling. A magnetic separator 54 may be placed between the upper end of auger screw 48 and the lower end of auger screw 50. As glass falls between the upper end of auger screw 48 to the lower end of auger screw 50, magnetic separator 54 can remove residual metal components from the flow of broken glass. Metals removed by separator 54 fall through shaft 56 to barrel 58.

A cold air wash may be provided to the upper end of auger 48 to remove residual mercury vapor from the flow of broken glass. The cold air wash can be provided from plenum 38 through a duct 60 and removed from auger 48 through an air wash outlet 23. The cold air wash will be described below in detailed by reference to FIG. 5.

Powder removed from enclosure 12 through outlet 20 may be lifted by auger screw 62 and deposited into barrel 64. It is desirable that auger 62 and any additional tubing carrying powder between outlet 20 and barrel 64 be substantially sealed to prevent the dispersion of mercury.

Figure 3:
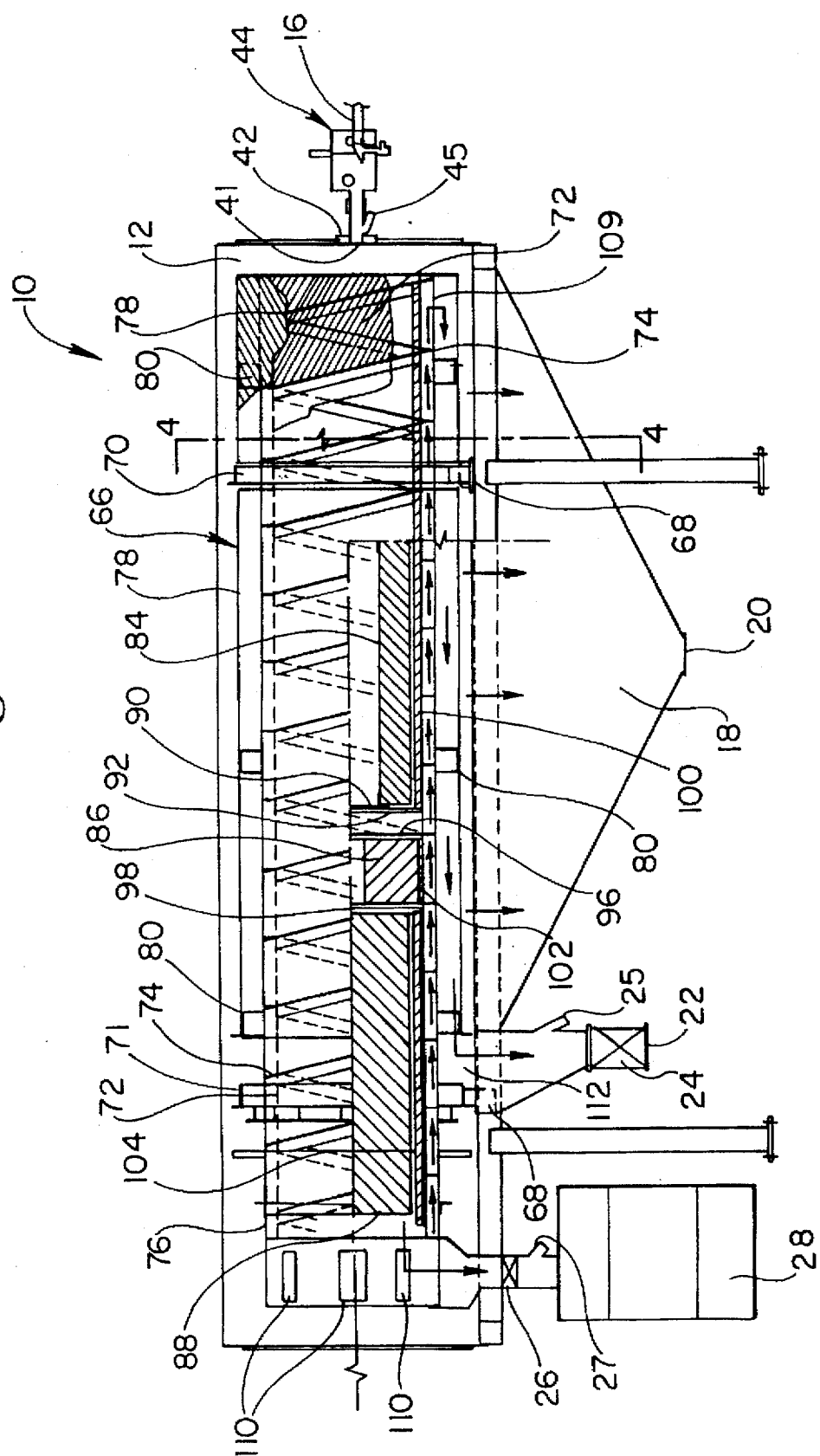
FIG. 3 shows a longitudinal cross section of the lamp processing machine.
Figure 4:
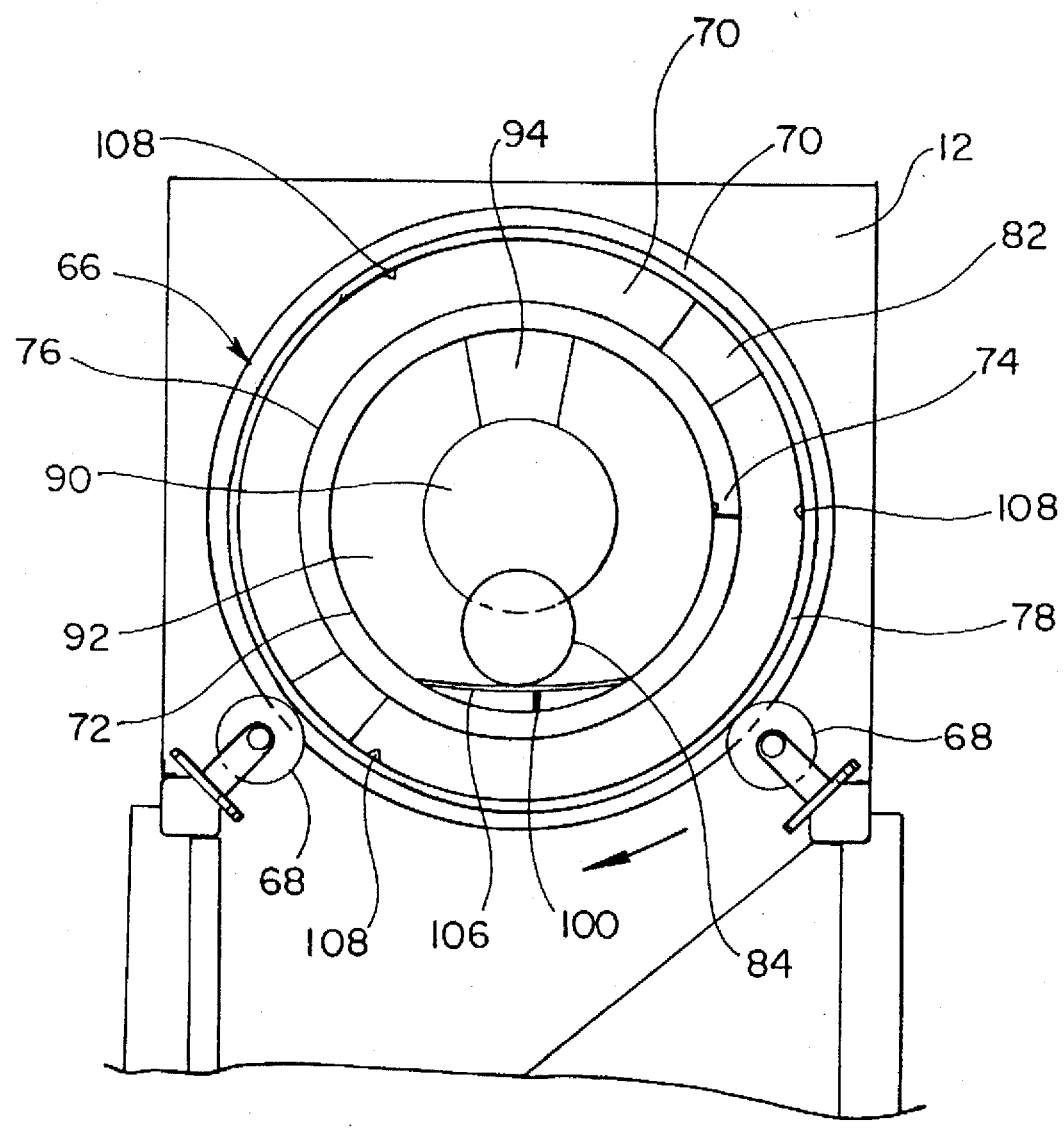
FIG. 4 shows a latitudinal cross section of the lamp processing machine taken from FIG. 3.

Referring to FIGS. 3 and 4, FIG. 3 is a longitudinal cross section through enclosure 12 and FIG. 4 is a latitudinal cross section taken from FIG. 3. FIG. 3 and 4 show the rotary trummel referred to by the numeral 66 disposed within enclosure 12. Trummel 66 is mounted for rotation about its longitudinal axis on rollers 68. Trummel 66 is preferably mounted at a longitudinal downward slope away from lamp inlet 41. The slope may be 1 inch and 12 feet, but other slopes may used.

The trummel includes an inner generally cylindrical screen 72. For clarity, only the upper and lower extremities of screen 72 have been shown in FIG. 3, except at the extreme right of the Figure. An angle may be used to form a helical archimedes like screw 74 around inner screen 72. Concentrically disposed around inner screen 72 and screw 74 is a solid inner tube 76. Screw 74 can be used to support inner screen 72 and separate screen 72 from inner tube 76. An outer screen 78 is concentrically disposed around inner tube 76. Like screen 72, only a portion of screen 78 is shown in FIG. 3 for clarity. Generally longitudinally and inwardly extending paddles 108 may be attached to the inside of outer screen 78. Spacers 80 may be disposed concentrically around inner tube 76, for example at 45° intervals to support inner tube 76 and separate tube 76 from outer screen 78.

Support bands 70 and 71 for supporting trummel 66 on rollers 68 can be concentrically disposed around and attached to inner tube 76. At least one longitudinal opening 82 should be provided through support band 70.

In FIG. 3, the forward lower quarter of screw 74, generally to the left of band 70, has been removed to reveal generally cylindrical rollers 84, 86 and 88. Also disposed within inner screen 72 is a standoff barrier 90 connected to a support 92. Support 92 is in turn connected to inner screen 72. At least one opening 94 extends longitudinally through support 92. Two additional members, a divider 96 and a divider 98 may be fixed in inner screen 72 to separate roller 86 from roller 88. Each divider 96 and 98, like support 92, must also include at least one longitudinal opening. It is preferable that longitudinal opening 94 of support 92 not be longitudinally aligned with the longitudinal opening through divider 96. Scoops 100, 102 and 104 may be attached to the inside of inner screen 72. Scoops 100, 102 and 104 may be shielded from rollers 84, 86 and 88, respectively by guards. A typical scoop guard 106 is shown in FIG. 4 supporting roller 84. Scoop guard 106 provides a generally smooth latitudinal transition from inner screen 72 across scoop 100 and back to inner screen 72.

Metal outlets 110 from trummel 66 may be provided at the end of inner screen 72 opposite lamp inlet 41. A glass and powder outlet 109 from inner tube 76 to outer screen 78 may be provided at the end of inner tube 76 proximate lamp inlet 41. A glass outlet 112 from outer screen 78 may be provided at the end of screen 78 opposite the lamp inlet 41.

In use, lamps are drawn into inner screen 72 by injection tube 16 through inlet 41. The suction applied to suction port 46 should be sufficient to accelerate the lamps to a speed at which the lamps break on impact with a surface within inner screen 72. When the lamp breaks, powder, glass and metal lamp components will be dispersed within inner screen 72, generally between standoff barrier 90 and inlet 41. The metal components may still have attached shards of glass, and both the metal and glass components may be covered with powder. The powder may include heavy and light particles and mercury. Liquid mercury, heavier particles, glass and metal components will fall to a lower portion of inner screen 72. Mercury vapor and lighter particulates may remain suspended within enclosure 12.

The openings through the inner screen are sized to allow the powder to immediately pass through to inner tube 76. Smaller fragments of glass can also immediately pass through inner screen 72, however, much of the glass must be broken by roller 84 before it can pass through inner screen 72. As shown by the arrows in FIG. 4, trummel 66 rotates such that scoop 100 may lift glass and metal components above roller 84 which rotates at a lower portion of inner screen 72. At a position above roller 84, components in scoop 100 drop on or in the path of roller 84. Because the trummel is sloped away from lamp inlet 41 glass and metal end caps still remaining in inner screen 72 will pass through opening 94 in support 90 and a similar opening in divider 96. Roller 86, will continue the process of breaking the glass into pieces which can pass through inner screen 72. Glass still remaining on screen 72 will pass through the opening in divider 98. Here roller 88 will break the remaining glass into pieces small enough to pass through inner screen 72.

It is believed that the diameter and weight of the rollers effects the performance of the rollers. Heavier rollers and rollers having larger diameters are believed to break material more rapidly than lighter rollers or rollers having relatively smaller diameters. The rollers may be stood off or supported slightly above the inner screen to prevent the glass from being crushed into a powder or pieces small enough to fall through the holes in the side of the outer screen. To stand off the rollers, concentric bands may be attached to and around the rollers. It is anticipated that the size of the holes through the side of the screens will also effect the size of the pieces the glass is broken into. It is believed that the slower the rate the glass is crushed, the longer the trummel must extend. It is also believed that placing the trummel on a relatively steeper downward slope will cause glass and metal lamp components to move along the inner screen more rapidly, thus requiring a higher glass breaking rate.

As trummel 66 continues to rotate glass and powder through inner screen 72 to inner tube 76 is carried back upwardly toward the end of tube 76 proximate lamp inlet 41 by screw 74 as shown by the arrows in FIG. 3. When the glass and powder reach outlet 109 from inner tube 76, the glass and powder fall onto outer screen 78. The openings through outer screen 78 are sized such that powder immediately begins to fall through screen 78 into pan 18 and through outlet 20. The openings through outer screen 78 are also sized to prevent the glass from falling through screen 78 with the powder. Continued rotation of trummel 66 in combination with the downward slope of trummel 66 carries the glass downward toward the end of outer screen 78 opposite lamp inlet 41. As the glass moves downward on screen 78, the glass is churned within screen 78 by paddles 108. Churning polishes the glass to remove residual powder. The residual powder then falls through outer screen 78. At the end of screen 78, the glass falls through glass outlet 112, airlock 24 and outlet 22-to auger screw 48. For the churning to be most effective at removing residual powder, it is desired to break the glass into pieces small enough that as the glass is churned, the sides of the pieces can rub together.

Figure 5:
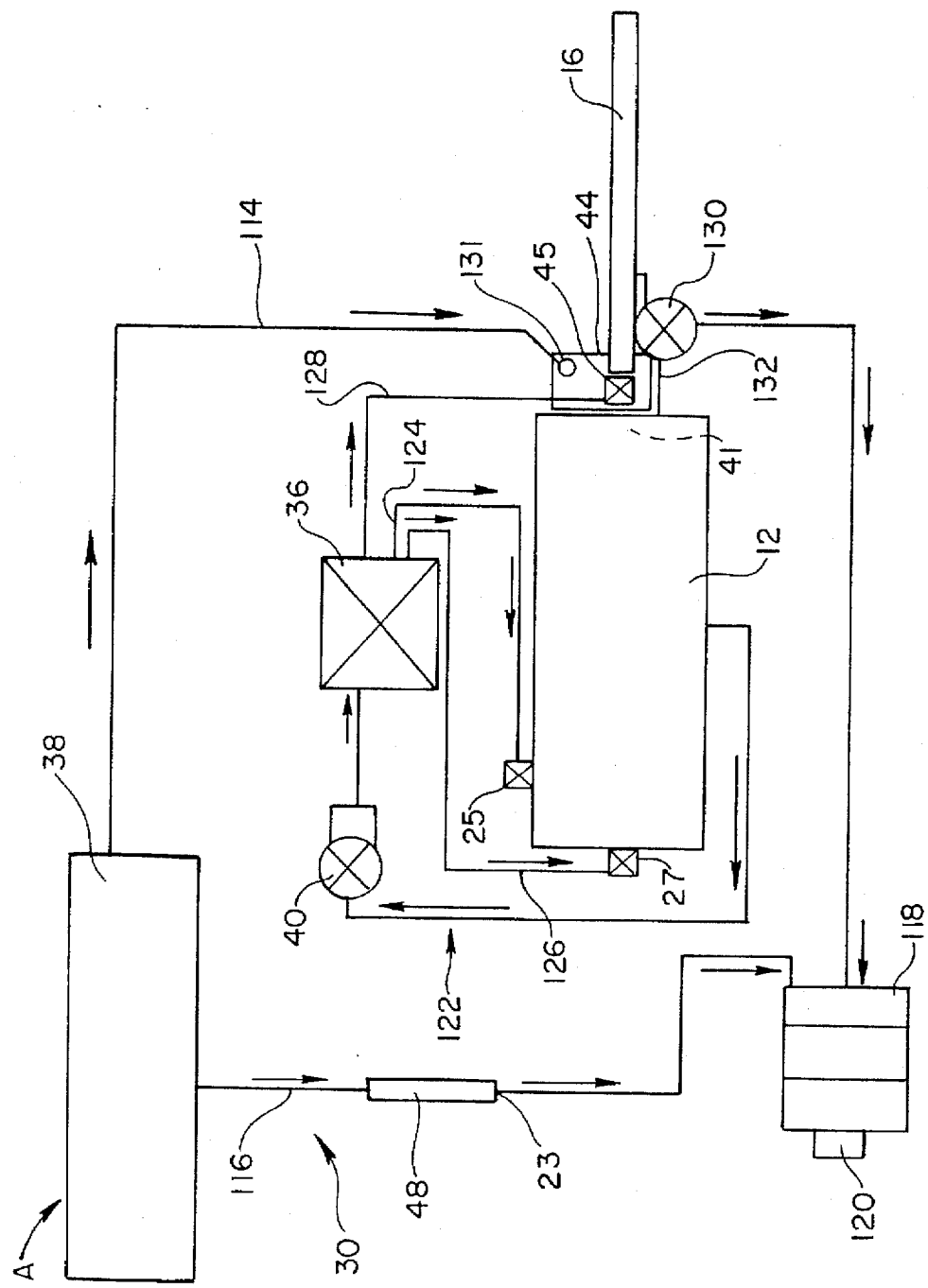
FIG. 5 shows a schematic of the air cooling and circulation system of the lamp processing machine.

FIG. 5 shows a schematic of the air cooling and circulation system for lamp processing machine 10. As described above, with respect to FIG. 1, cooling system 30 recirculates cool air through air-to-air heat exchanger 36 and cold air plenum 38. As shown in FIG. 5, cool air may be drawn from cold air plenum 38 through ducts 114 and 116. Duct 114 can deliver cool dried air to pneumatic reflex valve 44 and lamp inlet 41 through a barometric damper 131. The reasons for delivering air to damper 131 will be described in more detail below with respect to FIGS. 6 and 7. Cold air drawn through duct 116 is first discharged into the upper end of auger screw 48 and then withdrawn proximate the lower end of auger screw 48 at chilled air outlet 23. Drawing cool air through auger screw 48 cleanses any residual mercury vapors from the glass discharged from enclosure 12.

The air removed from chilled air wash outlet 23 is then drawn through a filter pack 118 by an after blower 120. Filter pack 118 may include a prefilter to remove gross suspended solids, a HEPA filter to remove fine suspended solids and a treated carbon filter to remove mercury from the air prior to being discharged to the atmosphere through after blower 120. It is well known in the art of filtration that several types of treated carbon filters are available for the removal of mercury. Air drawn from cold air plenum 38 through ducts 114 and 116 is replaced by fresh atmospheric air at A.

The air circulation system includes a air recirculation system 122. As shown in FIG. 5, blower 40 draws air directly from enclosure 12 and directs it through air-to-air heat exchanger 36. Air-to-air heat exchanger 36 cools the recirculating air and discharges it through three ducts 124, 126 and 128 to recirculating air inlets 25, 27 and 45, respectively. Recirculated air directed through inlet 25 forces powder and/or mercury which might otherwise exit enclosure 12 through glass outlet 22 back into enclosure 12. Likewise, recirculated air discharged through air inlet 27 forces powder and/or mercury back into metal outlet 26. The recirculated air forced into inlet 45 performs a similar function with respect to lamp inlet 41.

The air circulation system also includes a main vacuum blower 130. Main vacuum blower 130 provides suction to injection tube 16 through suction port 46. This provides the suction necessary to draw lamps into injection tube 16. Blower 130 also maintains a negative pressure, that is, less than atmospheric pressure, in enclosure 12. Blower 130 draws air from enclosure 12 through a small duct 132. As mentioned previously, maintaining a negative pressure in enclosure 12 draws fresh air into any leaks in enclosure 12 rather than letting powder or mercury escape through those leaks. It is anticipated that negative pressure of as little as 1/10 of an inch of mercury will provide satisfactory results. A greater or lesser negative pressure may also be used. Since enclosure 12 is substantially sealed, it is anticipated that very little air must be withdrawn through duct 132 by blower 130. Air drawn through blower 130 is directed to filter pack 118. The air is drawn through filter pack 118 and discharged to the atmosphere by after blower 120.

In an embodiment of processing machine 10, enclosure 12 may be 4 feet wide by 15 feet long by 42 inches high. In this embodiment, it is anticipated that during normal operation, blower 130 will need to withdraw no more than 20 cubic feet per minute of air from enclosure 12 through duct 132. Consequently, very little contaminated air from enclosure 12 will have to be filtered through filter pack 118. It is anticipated that the less air drawn through duct 132, the longer the filters within filter pack 118 will last. Much of the powder and mercury vapors suspended within enclosure 12 when a lamp breaks will remain within the enclosure. It is anticipated that eventually this powder and mercury vapor will settle and condense respectively, and subsequently exits enclosure 12 through outlet 20. To limit the amount of air required to be withdrawn by blower 130 to maintain negative pressure in enclosure 12 it should be appreciated that enclosure 12 should be completely sealed except for essential openings such as outlets for the glass, powder and metal lamp components and the inlet for the lamps. It is anticipated that the embodiment of lamp processing machine 10 in accordance with the present invention as described within this paragraph may process 20,000 or more lamps within an eight hour period or approximately 50 lamps per minute.

Figure 6:
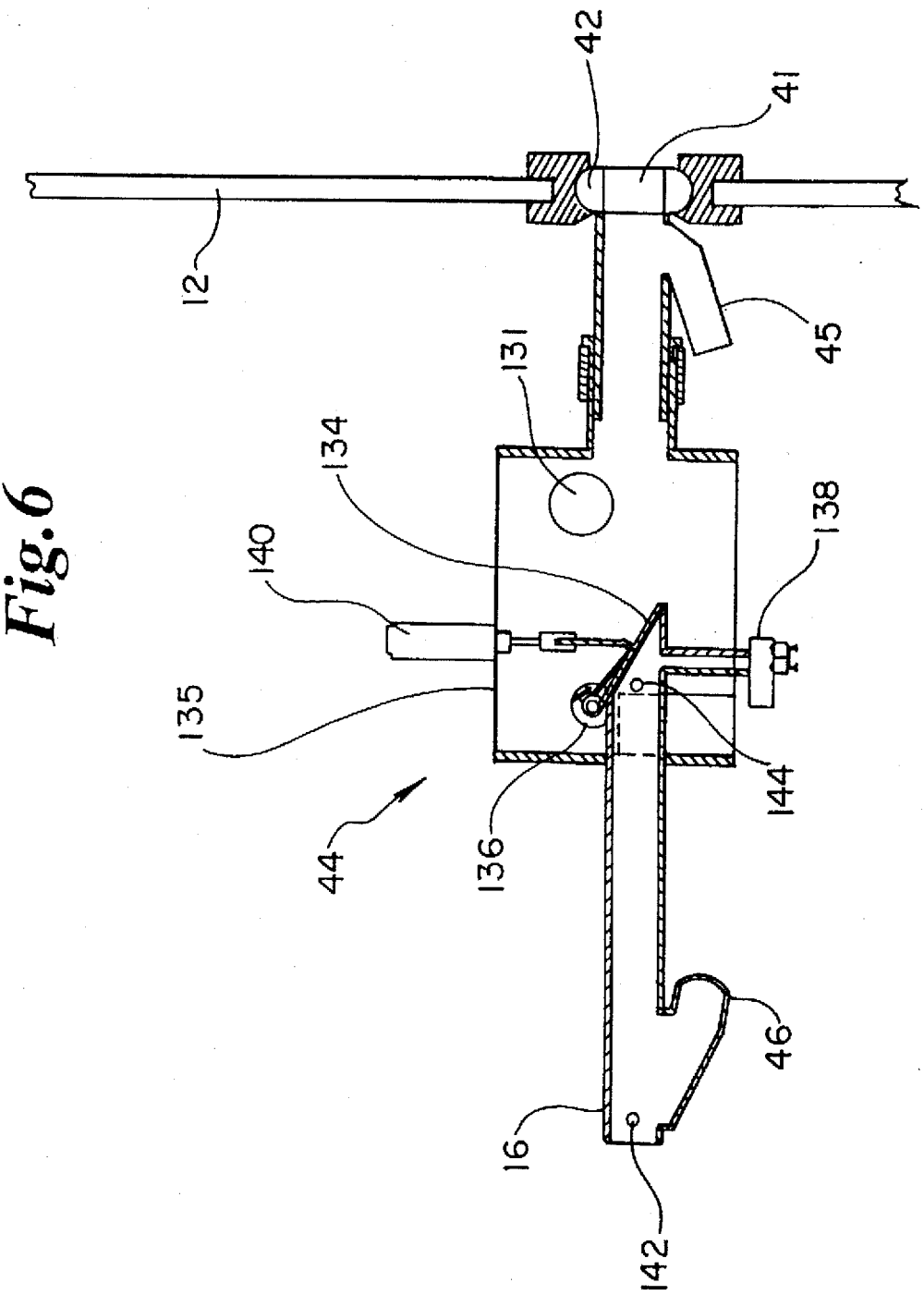
FIG. 6 shows a side view of a pneumatic reflex valve.

FIG. 6 shows a first embodiment of pneumatic reflex valve 44. Valve 44 includes a flapper 134 mounted within a housing 135 on a hinge 136. Flapper 134 is rotatable about hinge 136 between a first closed position covering an end of injection tube 16 proximate inlet 41 and a second open position not covering the end. As shown in FIG. 6, flapper 134 is in the first closed position covering the end of tube 16. In operation, when flapper 134 is in the closed first position, the pressure within tube 16 is significantly lower than the pressure in valve housing 135. The interior of valve housing 135 is in fluid communication with the interior of enclosure 12. Consequently, interior valve housing 135 is usually slightly negative. The interior of tube 16, however, is under the influence of main vacuum blower 130 by way of suction port 46. Typically, blower 130 will create a relatively larger negative pressure in tube 16.

The differential pressure between the interior of tube 16 and valve housing 135 tends to hold flapper 134 in the first closed position. To move flapper 134 from the first closed position to the second open position, valve 44 includes an air release input valve 138 and an air ram 140. Valve 138 and ram 140 are responsive to lamps passing lamp sensors 142 and 144. As a lamp is drawn through tube 16, it passes sensor 142 which triggers valve 138 to allow a burst of air to enter tube 16 proximate flapper 134. With the pressure momentarily reduced, ram 140 is activated to draw flapper 134 from the first closed position to the second open position. When the lamp passes sensor 144, ram 140 is triggered to push flapper 134 back into the closed first position. It can be appreciated that a solenoid or other source of motive force may be used in place of air ram 40 to move flapper 134 from the first position to the second position and back to the first position.

It should be noted that barometric damper 131 may open under certain circumstances to introduce cooled air, from cold air plenum 38 into housing 135. Damper 131 is a valve which preferably opens when the pressure in housing 135 becomes more negative than the desired negative pressure maintained in enclosure 12. This may happen under at least two circumstances. First, when flapper 134 is in the second open position, air may be drawn from housing 135 into tube 16 lowering the pressure within housing 135. The pressure within housing 135 may also be lowered if the pressure within enclosure 12 is lowered. This may occur when lamps inserted into enclosure 12 break. As the lamps break within enclosure 12 they implode because their interior is maintained at a near vacuum.

Figure 7:
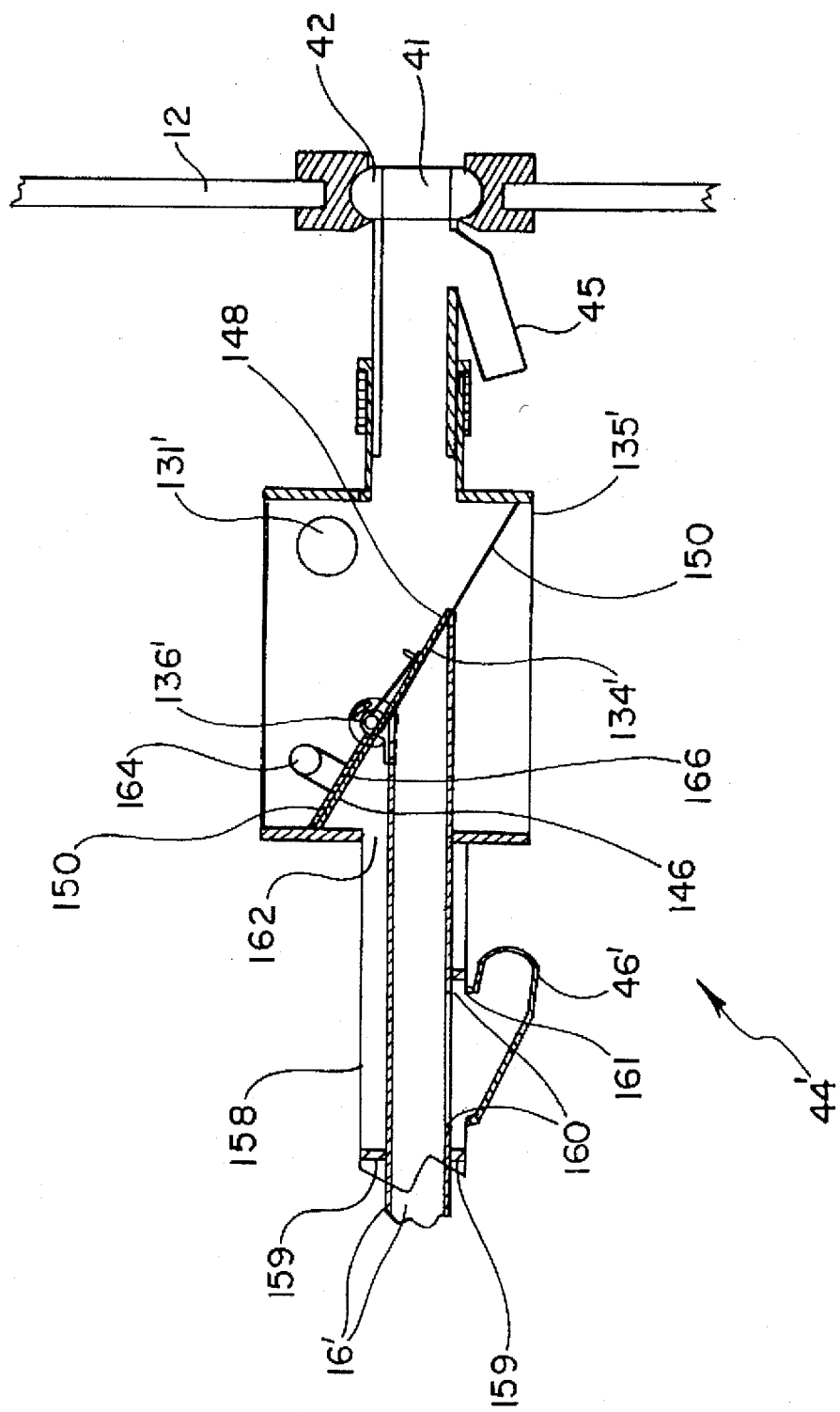
FIG. 7 shows a side view of another embodiment of the pneumatic reflex valve.

FIG. 7 shows an alternate embodiment of the pneumatic reflex valve 44'. Pneumatic reflex valve 44' includes a flapper 134' housed within a valve housing 135'. Flapper 134' is rotatable about a hinge 136'. Flapper 134' includes two ends 146 and 148 extending in opposite directions from hinge 136'.

Housing 135' includes a partition 150 which extends from hinge 136', parallel and adjacent to end 146 of flapper 134' in the first position, to opposite sides of housing 135'. Partition 150 is disposed to the side of end 146 opposite tube 16'. A tube 164 may extend from the exterior of housing 135' to an opening 166 through partition 150. Opening 166 is adjacent the side of end 146 of flapper 134' opposite tube 16. The end of tube 164 opening outside of housing 135' may be exposed directly to atmospheric conditions. Consequently, the air pressure in tube 164 will generally be at or above atmospheric pressure.

Valve 44' also includes an outer tube 158 surrounding a portion of tube 16 adjacent housing 135'. Outer tube 158 is connected to tube 16 by seals 159 and 161 with suction port 46' disposed between seal 159 and housing 135'. Suction port 46' is not connected directly to tube 16', but rather to outer tube 158. The interior of tube 16' is in fluid communication with suction port 46', however, by way of a suction port 160 through tube 16'.

In use, when a lamp is not present in tube 16' the suction created through ports 46' and 160 create a relatively high negative pressure within tube 16' while flapper 134 is in the first closed position sealing the end of tube 16'. The interior of outer tube 158 is also exposed to the suction through port 46'. Tube 158 is open at one end to the portion of the interior of housing 135' enclosed by partition 150 and adjacent tube 16'. Since tube 158 is exposed to the suction through port 46' the air pressure in tube 158 and the portion of the interior of housing 135' exposed to the interior of tube 158 is at a relatively high negative pressure, approximately the same as in tube 16'. Exposing the side of end 146 to atmospheric pressure through only tube 164 will result in a greater force being applied to the side of end 148 by the longer negative pressure within tube 16. This greater force exerted on end 148 will hold flapper 134' in the first closed position.

When a lamp is drawn into tube 16', the lamp accelerates toward suction port 160. Momentum carries the lamp over port 160 toward flapper 134'. As the lamp passes over port 160, the suction created by main blower 130 is temporarily, at least partially, blocked by the lamp. The blockage of port 160 causes the negative pressure in tube 16' to become less negative, while simultaneously the negative pressure in outer tube 158 remains constant or becomes more negative. When valve 44' is properly adjusted, these changes in pressure will causes flapper 134' to momentarily move from the first closed position to the second open position. Once the lamp has passed through valve 44' the pressure within tubes 16' and 158 will return to their original levels and flapper 134' will return to the first closed position. In addition to the function of barometric damper 131 as described above, barometric damper 131' also aids in maintaining the appropriate balance of pressures on opposite sides of flapper 134' and in enclosure 12.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A pneumatic reflex valve for an injection tube, the tube having an end and a longitudinal axis, the valve comprising:

a hinge configured for mounting proximate one end of the tube;

a flapper mounted to the hinge for rotation between a first position configured to generally seal the end of the tube and a second position opening the end of the tube;

a source of low pressure; and a source of relatively higher pressure, wherein the flapper includes first and second ends extending generally in opposite directions from the hinge, each end having first and second sides, the first sides being exposed to the low pressure source and the second sides being exposed to the high pressure source, the pressure sources being controllable to exert forces on the sides to move the flapper between the first position and the second position.

2. A pneumatic reflex valve in accordance with claim 1, wherein the pressure on one side is increased to move the flapper to the second position in response to insertion of a lamp in the tube.

3. A pneumatic reflex valve for an injection tube, the tube having an end and a longitudinal axis, the valve comprising:

a hinge configured for mounting proximate one end of the tube;

a flapper mounted to the hinge for rotation between a first position configured to generally seal the end of the tube and a second position opening the end of the tube; and a ram responsive to a lamp passing a sensor in the tube, the ram being capable of pulling the flapper toward the second position from the first position.

4. A pneumatic reflex valve in accordance with claim 3, wherein the ram can push the flapper from the second position toward the first position.

\* \* \* \* \*